US011627406B1

(12) United States Patent
Wright

(10) Patent No.: US 11,627,406 B1
(45) Date of Patent: Apr. 11, 2023

(54) WEARABLE AUDIO DEVICE WITH SELECTIVE FREQUENCY ATTENUATION

(71) Applicant: Change Healthcare Holdings, LLC, Nashville, TN (US)

(72) Inventor: David Alan Wright, Nashville, TN (US)

(73) Assignee: Change Healthcare Holdings, LLC, Nashville, TN (US)

( * ) Notice: Subject to any disclaimer, the term of this patent is extended or adjusted under 35 U.S.C. 154(b) by 0 days.

(21) Appl. No.: 17/587,400

(22) Filed: Jan. 28, 2022

(51) Int. Cl.
| H04R 1/10 | (2006.01) |
| H04R 1/08 | (2006.01) |
| H04R 3/04 | (2006.01) |
| G06F 3/01 | (2006.01) |
| G06F 3/04847 | (2022.01) |
| G06F 3/16 | (2006.01) |
| H04R 5/02 | (2006.01) |

(52) U.S. Cl.
CPC .......... *H04R 1/1083* (2013.01); *G06F 3/016* (2013.01); *G06F 3/04847* (2013.01); *G06F 3/165* (2013.01); *H04R 1/08* (2013.01); *H04R 1/1016* (2013.01); *H04R 1/1041* (2013.01); *H04R 3/04* (2013.01); *H04R 2420/07* (2013.01)

(58) Field of Classification Search
CPC ...... H04R 1/1083; H04R 1/08; H04R 1/1016; H04R 1/1041; H04R 3/04; H04R 2420/07; G06F 3/016; G06F 3/04847; G06F 3/165
USPC .......................................................... 381/74
See application file for complete search history.

(56) References Cited

U.S. PATENT DOCUMENTS

| 2008/0205660 | A1* | 8/2008 | Goldstein | G01H 3/14 |
| | | | | 381/60 |
| 2020/0372766 | A1* | 11/2020 | Biggs | H04R 3/04 |
| 2021/0290176 | A1* | 9/2021 | Petterson | A61B 5/486 |
| 2022/0386018 | A1* | 12/2022 | Everman | G10K 11/17823 |

* cited by examiner

*Primary Examiner* — Ammar T Hamid
(74) *Attorney, Agent, or Firm* — Meunier Carlin & Curfman LLC

(57) ABSTRACT

A wearable audio device includes a speaker, a wireless communications interface, an audio sensor configured to capture ambient noise in an environment occupied by a user wearing the wearable audio device, and memory having instructions stored thereon that, when executed by one or more processors, cause the one or more processors to perform operations including receiving, via the wireless communications interface, a first user input identifying a frequency range to be attenuated, generating an audio signal from the captured ambient noise, attenuating the audio signal to reduce an amplitude of one or more frequency components based on the frequency range, and causing the speaker to produce sound based on the attenuated audio signal.

16 Claims, 6 Drawing Sheets

WEARABLE AUDIO DEVICE WITH SELECTIVE FREQUENCY ATTENUATION

BACKGROUND

The present disclosure relates generally to wearable audio devices (e.g., electronic headphones, hearing aids, etc.) and more specifically to wearable audio devices that can selectively attenuate particular frequencies or frequency ranges. Many electronic headphones (e.g., over-ear, in-ear, etc.) lack ambient noise filtering and those that do filter ambient noise often do not provide a user with a significant amount of control over sounds or frequencies that are filtered. Additionally, many types of electronic headphones do not provide adequate protection against loud or obtrusive ambient noises. Other types of hearing protection, such as earmuffs or ear buds, tend to attenuate all frequencies or wide ranges of frequencies, and often lack any sort of user control.

SUMMARY

One implementation of the present disclosure is a wearable audio device that includes a speaker, a wireless communications interface, an audio sensor configured to capture ambient noise in an environment occupied by a user wearing the wearable audio device, and memory having instructions stored thereon that, when executed by one or more processors, cause the one or more processors to perform operations including receiving, via the wireless communications interface, a first user input identifying a frequency range to be attenuated, generating an audio signal from the captured ambient noise, attenuating the audio signal to reduce an amplitude of one or more frequency components based on the frequency range, and causing the speaker to produce sound based on the attenuated audio signal.

In some embodiments, the wearable audio device of further includes a haptic device configured to produce vibrations, the operations further including receiving, via the wireless communications interface, a notification from a user device associated with the user and causing the haptic device to produce vibrations responsive to the notification.

In some embodiments, the audio sensor is a microphone or a piezoelectric transducer.

In some embodiments, the first user input is received from a user device associated with the user.

In some embodiments, the user device is configured to present a graphical user interface (GUI) including at least one of a movable slider or a text entry field for entering, by the user, the first user input.

In some embodiments, attenuating the audio signal includes passing the audio signal through at least one of a low-pass filter, a high-pass filter, a band-pass filter, or a notch filter.

In some embodiments, the wearable audio device of further includes an analog-to-digital converter (ADC), wherein generating the audio signal including passing the audio signal through the ADC to convert the audio signal into a digital signal.

In some embodiments, the digital signal is attenuated using a digital notch filter.

In some embodiments, the wearable audio device is configured as over-ear headphones, in-ear headphones, a behind-the-ear hearing aid, an in-the-ear hearing aid, a receiver-in-the-ear hearing aid, or an implantable hearing aid.

Another implementation of the present disclosure is a method for selectively attenuating frequencies in an audio signal. The method includes capturing, by an audio sensor in a wearable audio device, the audio signal, receiving an indication of a frequency range to be attenuated from the audio signal, generating an attenuated audio signal by removing or reducing one or more frequency components in the audio signal based on the frequency range, and producing, by a speaker of the wearable audio device, sound based on the attenuated audio signal.

In some embodiments, the method further includes receiving, from a remote computing device, a notification and causing a haptic device of the wearable audio device to produce vibrations responsive to the notification.

In some embodiments, the audio sensor is a microphone or a piezoelectric transducer.

In some embodiments, the indication of the frequency range is received from a user device associated with a user of the wearable audio device.

In some embodiments, the user device is configured to present a graphical user interface (GUI) including at least one of a movable slider or a text entry field for entering, by the user, the indication of the frequency range.

In some embodiments, generating the attenuated audio signal includes filtering the audio signal through at least one of a low-pass filter, a high-pass filter, a band-pass filter, or a notch filter.

In some embodiments, the audio signal is an analog signal, the method further including converting the audio signal into a digital signal prior to generating the attenuated audio signal.

In some embodiments, the digital signal is attenuated using a digital notch filter.

In some embodiments, the wearable audio device is one of over-ear headphones, in-ear headphones, a behind-the-ear hearing aid, an in-the-ear hearing aid, a receiver-in-the-ear hearing aid, or an implantable hearing aid.

Yet another implementation of the present disclosure is a pair of in-ear headphones that include a wireless communications interface for receiving data from a remote computing device, a microphone configured to capture ambient noise, and memory having instructions stored thereon that, when executed by one or more processors, cause the one or more processors to perform operations including converting the captured ambient noise into a first digital signal, receiving, from the remote computing device, an indication of one or more frequency components to remove from the first digital signal, generating a second digital signal by filtering the first digital signal to remove the one or more frequency components, converting the second digital signal into a first analog signal, and producing sound based on the first analog signal.

In some embodiments, the in-ear headphones further include a haptic device configured to produce vibrations, the operations further including receiving, via the wireless communications interface, a notification from the remote computing device and causing the haptic device to produce vibrations responsive to the notification.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, a wearable audio device with selective frequency attenuation is shown, according to various embodiments. As discussed herein, a wearable audio device may be any portable electronic device that can be worn by a user and that is configured to produce sound. Example wearable audio devices can include, but are not limited to headphones (e.g., over-ear, on-ear, in-ear), hearing aids (e.g., in-ear, behind-the-ear, implantable, etc.), ear plugs, earmuffs, and the like. Generally, these wearable audio devices include at least one speaker (i.e., transducer) capable of converting an audio signal into sound.

Unlike many other types of headphones and hearing aids, however, the wearable audio device described herein includes an audio sensor (e.g., a microphone) configured to capture ambient noise from an environment occupied by a user. Captured ambient noise can then be filtered, either through an analog or a digital filter, to attenuate (i.e., reduce) or eliminate specific frequencies. Notably, the user may select the specific frequencies to attenuate, such as by entering a frequency or frequency range on a user interface (e.g., presented via a user device). Thus, the wearable audio device provides the user with a great deal of control for selectively attenuating frequencies based on location, activity, etc. For example, the user could choose to attenuate high frequencies at concerts or other public events to improve comfort and reduce the risk of hearing damage. As another example, emergency response personnel (e.g., firefighters, police, etc.) can choose to attenuate the predominate frequencies associated with sirens, etc. Additional features and advantages will be discussed in greater detail below.

Wearable Audio Device

Figure 1B:
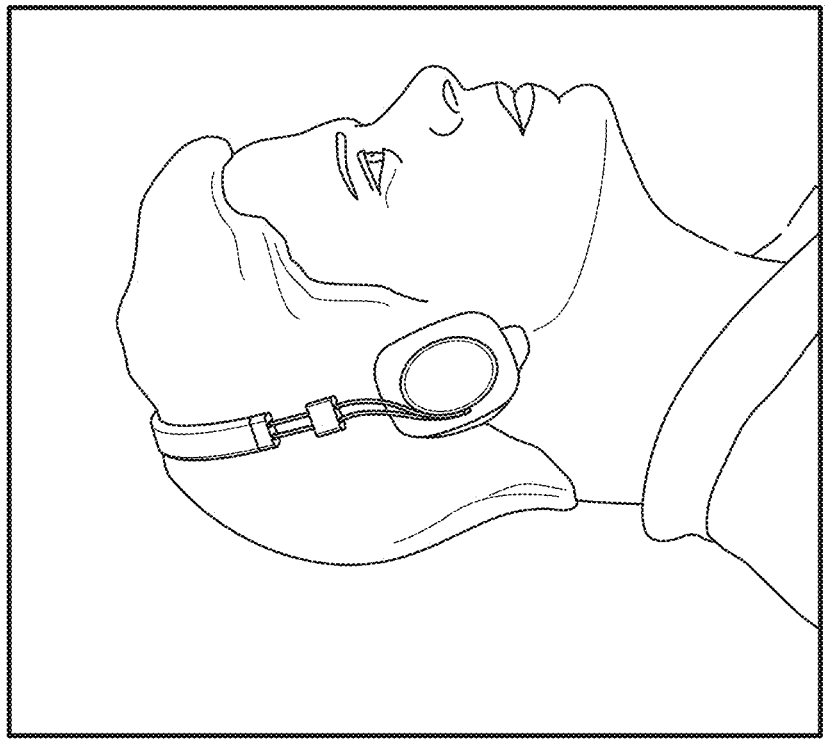
FIGS. 1A-1D illustrate example configurations of different wearable audio devices, according to some embodiments.
Figure 1A:
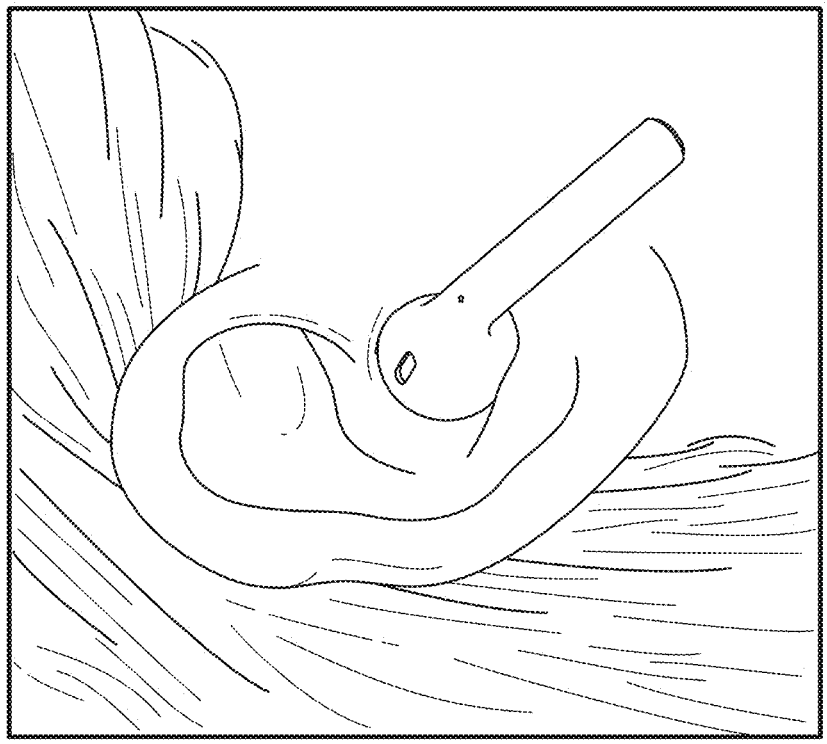
Figure 1D:
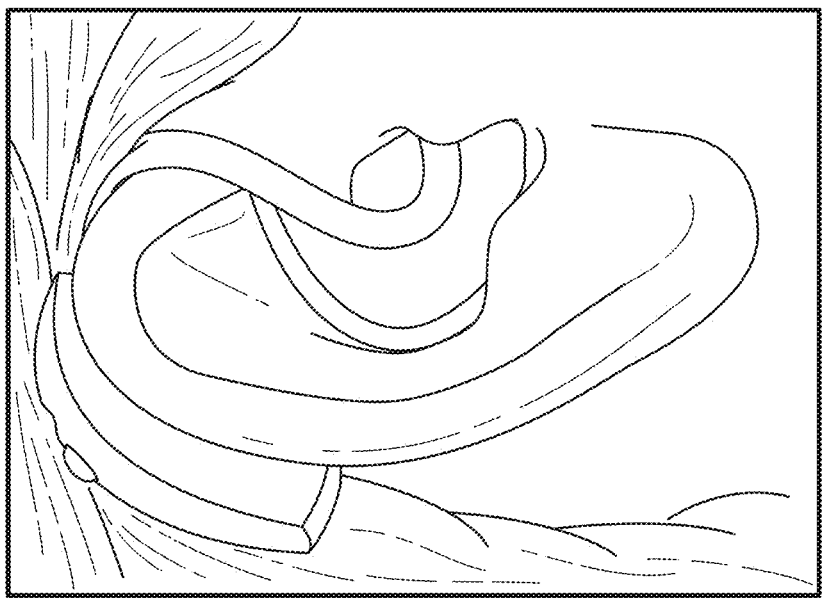

Referring first to FIGS. 1A-1D, various configurations of wearable audio devices are shown, according to some embodiments. FIG. 1A, in particular, shows a configuration of the wearable audio device as an in-ear headphone or ear bud. In this configuration, a majority of the wearable audio device is positioned outside of the ear canal of a user; however, an end of the device containing a speaker and an opening (i.e., an acoustic outlet) may be positioned near or in the user's ear canal. In contrast, FIG. 1B shows a configuration of the wearable audio device as over-ear or on-ear headphones. Over-ear or on-ear headphones typically include a headband that spans the user's head and a pair of ear cups positioned on either end of the headband. Each of the ear cups include a speaker (i.e., driver) for producing sound and may include cushions for spacing the speakers off of the user's ears. In some embodiments, the cushions may be configured to surround the user's ear, thereby limiting or blocking ambient noises.

Figure 1C:
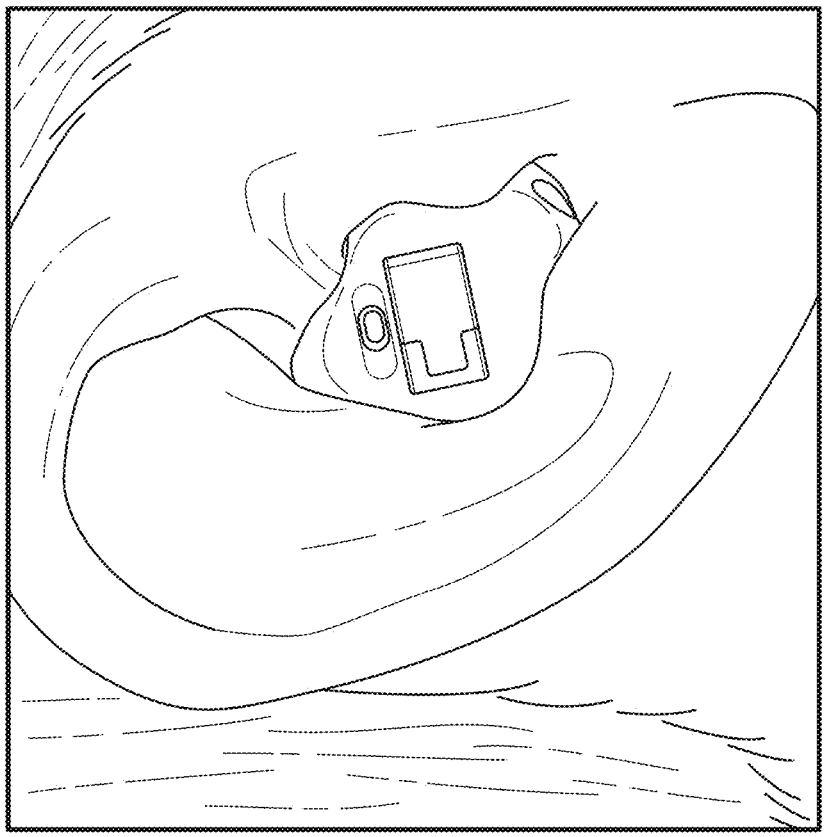

FIG. 1C shows a configuration of the wearable audio device as an in-the-ear (ITE) or in-the-canal (ITC) hearing aid. Unlike the earbud shown in FIG. 1A, an ITE/ITC hearing aid may fit more tightly into the ear canal of the user. For example, a portion of the ITE/ITC hearing aid (not shown) may extend into the user's ear canal and may contain a speaker. Likewise, the behind-the-ear configuration shown in FIG. 1D may include a portion that extends into the ear canal (i.e., an earpiece). The earpiece may be coupled to a receiver positioned behind the user's ear via a hollow tube, which is configured to transfer sound produced by a speaker in the receiver. It will be appreciated that the wearable audio device described herein are not intended to be limited to the various configurations shown in FIGS. 1A-1D but may be implemented in any other suitable configuration (e.g., ear plugs, earmuffs, etc.). All such embodiments are contemplated herein.

Figure 2:
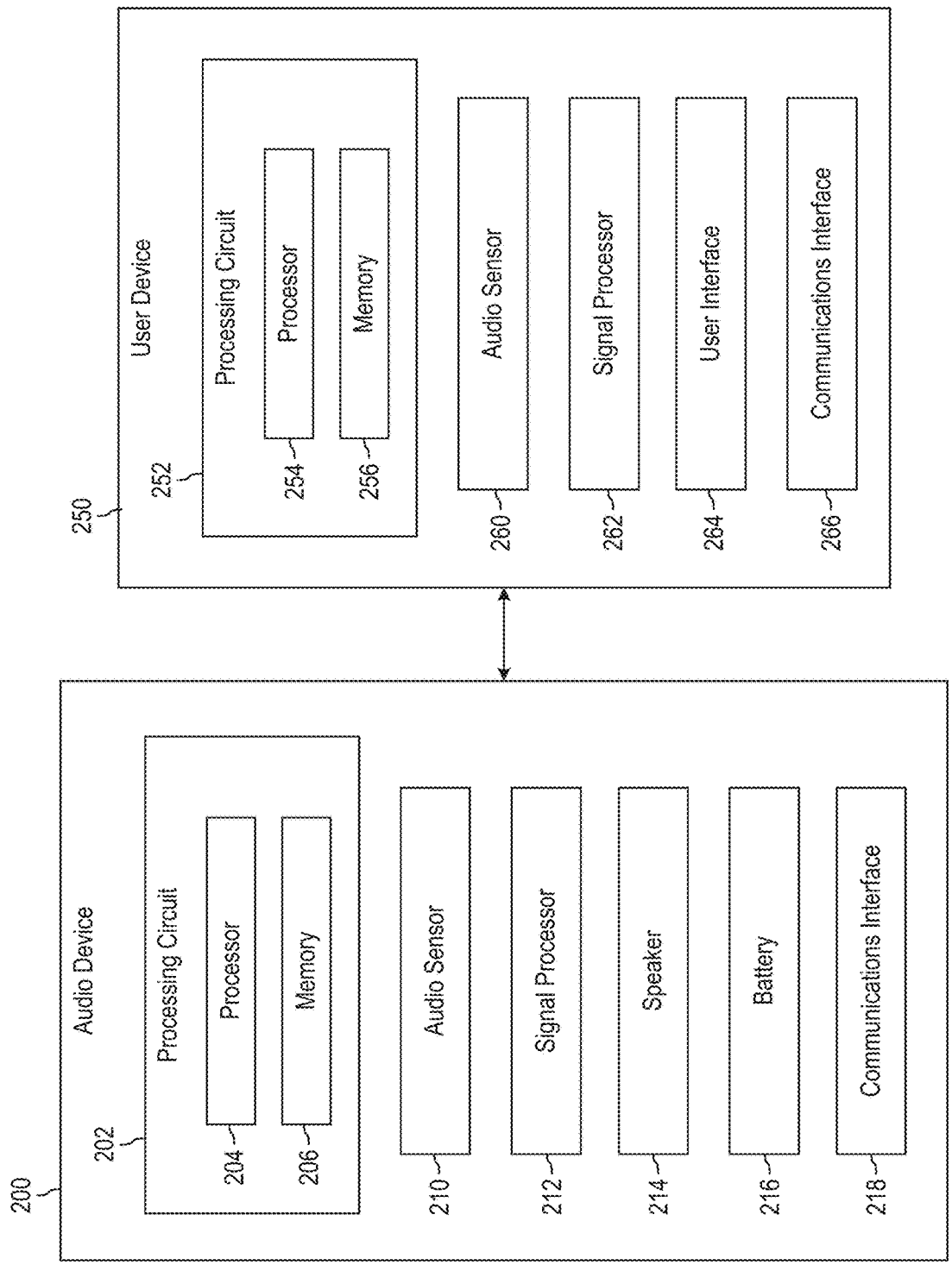
FIG. 2 is a block diagram of a wearable audio device with selective frequency attenuation, according to some embodiments.

Referring now to FIG. 2, a block diagram of a wearable audio device 200 with selective frequency attenuation is shown, according to some embodiments. As mentioned above, audio device 200 can attenuate specific frequencies responsive to a user input, which provides the user with a great deal of control not often found in other types of wearable audio device. For example, audio device 200 may reduce hearing damage and strain caused by specific frequencies or frequency ranges (e.g., high frequencies, which may be particularly damaging), thereby improving the comfort and health of the user.

Also shown in FIG. 2 is a user device 250, which is in communication with audio device 200. Specifically, as described in greater detail below, user device 250 can function in part as a user interface, allowing a user to enter or select specific frequencies or frequency ranges to remove or attenuate. Accordingly, user device 250 can be a mobile phone (e.g., a smartphone), an electronic tablet, a laptop, a desktop computer, or any other suitable type of electronic device. More generally, user device 250 may include any electronic device that allows a user to interact with audio device 200 by presenting and/or receiving user inputs through a user interface. In some embodiments, user device 250 represents a user interface positioned on audio device 200 (not shown). In the on-ear or over-ear headphone configuration of FIG. 1B, for example, audio device 200 may include a user interface positioned on at least one ear cup that provides similar or equivalent functionality as user device 250.

Audio device 200 is shown to include a processing circuit 202 that includes a processor 204 and a memory 206. Likewise, user device 250 is shown to include a processing circuit 252 that includes a processor 254 and a memory 256. Processors 204 and 254 can be general-purpose processors, application specific integrated circuits (ASICs), one or more field programmable gate arrays (FPGAs), a group of processing components, or other suitable electronic processing components. In some embodiments, processor 204 is configured to execute program code stored on memory 206 to cause audio device 200 to perform one or more operations. In some embodiments, processor 254 is configured to execute program code stored on memory 256 to cause user device 250 to perform one or more operations.

Memory 206, and similarly memory 256, can include one or more devices (e.g., memory units, memory devices, storage devices, etc.) for storing data and/or computer code for completing and/or facilitating the various processes described in the present disclosure. In some embodiments, memory 206 and/or memory 256 includes tangible, computer-readable media that stores code or instructions executable by processor 204 and/or processor 254, respectively. Tangible, computer-readable media refers to any media that is capable of providing data that causes audio device 200 and/or user device 250 to operate in a particular fashion. Example tangible, computer-readable media may include, but is not limited to, volatile media, non-volatile media, removable media and non-removable media implemented in any method or technology for storage of information such as computer readable instructions, data structures, program modules or other data.

Accordingly, memory 206 and memory 256 can include random access memory (RAM), read-only memory (ROM), hard drive storage, temporary storage, non-volatile memory, flash memory, optical memory, or any other suitable memory for storing software objects and/or computer instructions. One or both of memory 206 and memory 256 can include database components, object code components, script components, or any other type of information structure for supporting the various activities and information structures described in the present disclosure. In some embodiments, memory 206 is communicably connected to processor 204, such as via processing circuit 202, and can include computer code for executing (e.g., by processor 204) one or more processes described herein. Likewise, in some embodiments, memory 256 is communicably connected to processor 254, such as via processing circuit 252, and can include computer code for executing (e.g., by processor 254) one or more processes described herein.

While shown as individual components, it will be appreciated that any of processor 204, memory 206, processor 254, and memory 256 can be implemented using a variety of different types and quantities of processors and memory. For example, processor 204 may represent a single processing device or multiple processing devices. Similarly, memory 206 may represent a single memory device or multiple memory devices. In some embodiments, user device 250 may be implemented within a single computing device (e.g., one server, one housing, etc.). In other embodiments, user device 250 may be distributed across multiple servers or computers (e.g., that can exist in distributed locations). For example, user device 250 may include multiple distributed computing devices (e.g., multiple processors and/or memory devices) in communication with each other that collaborate to perform operations. Additionally, it will be appreciated that any of the functionality described herein with respect to audio device 200 may also be performed or implemented by user device 250, or vice versa. Additional features of user device 250 are described in greater detail below.

Still referring to FIG. 2, audio device 200 is also shown to include an audio sensor 210 for capturing sounds. Specifically, audio sensor 210 may be configured to capture and record (e.g., by processor 204) ambient noise in an environment (i.e., space) occupied by a user (e.g., a room, a building, a vehicle, an outdoor space, etc.). Accordingly, with consideration to the various configurations shown in FIG. 1A-1D, audio sensor 210 may be positioned on an outside surface of audio device 200 and/or an opening may be created on a housing of audio device 200 to allow audio sensor 210 to detect noises external to audio device 200. In some embodiments, audio sensor 210 a piezoelectric transducer or other type of transducer. In some embodiments, audio sensor 210 is a microphone. In either case, audio sensor 210 may be configured to convert sound waves into one of a digital or analog audio signal.

Subsequently, the captured audio signal may be manipulated by a signal processor 212. Specifically, signal processor 212 may be configured to attenuate one or more frequencies present in the audio signal. As described herein, attenuation is a reduction of strength (i.e., amplitude) of frequency components in an audio signal. Attenuation is generally measured in decibels (dB), where a higher dB value indicates a higher attenuation (i.e., reduction in strength) of the corresponding frequency component. For example, an attenuation of 3 dB may only slightly reduce the amplitude of a frequency component while an attenuation of 40 dB may effectively eliminate the frequency component.

In some embodiments, signal processor 212 includes one or more analog (i.e., physical) filters configured to attenuate a particular frequency or frequency range. Analog filters, in general, can include any number or type of physical electronic components for filtering (i.e., attenuating) frequencies or frequency ranges from analog audio signals. For example, basic analog filter circuits may include a combination of one or more resistors, capacitors, and/or inductors, although other types of analog filters may be constructed with additional components. In particular, signal processor 212 may include at least one of a low-pass filter, a high-pass filter, a band-pass filter, or a notch (i.e., stop-band) filter; however, in some embodiments, signal processor 212 includes a combination of multiple filters. Additionally, signal processor 212 may include amplifiers and other components to increase the amplitude of a filtered audio signal, to remove noise from the audio signal, etc.

As described herein, a low-pass filter is a filter designed to "pass through" frequencies that are below a cutoff frequency or, in other words, to attenuate frequencies above the cutoff frequency. Example first-order low-pass filters may include resistor-capacitor (RC), resistor-inductor (RL), or inductor-capacitor (LC) circuits, while example second-order low-pass filters may include at least one each of a resistor, capacitor, and inductor (i.e., an RLC circuit); however, it will be appreciated that the specific layout or configuration of the low-pass filter may vary based on implementation. For example, an active low-pass filter may include additional components such as an operational amplifier. Additionally, it will be appreciated that the specific cutoff frequency of a low-pass filter may be defined by the particular configuration of the circuit. In contrast, a high-pass filter is a filter designed to "pass through" frequencies that are above a cutoff frequency (i.e., attenuate frequencies below the cutoff frequency). Like the low-pass filters described above, high-pass filters may be RC, RL, LC, or RLC circuits, and/or may include additional components based on the specific implementation and desired cutoff frequency.

A band-pass filter is a filter designed to "pass through" frequencies within certain frequency range, thereby attenuating any frequencies outside of the frequency range. Band-pass filters are typically more complex than the low or high-pass filters described above and may therefore include any number and configuration of resistors, capacitors, and inductors, along with other suitable components (e.g., amplifiers). For example, a basic band-pass filter can be constructed by combining a low-pass and a high-pass filter. Accordingly, the allowed frequency range may be defined between the cutoff frequencies of said low-pass and high-pass filters. A notch filter, also referred to as a band-stop filter, is designed to attenuate only frequencies in a specific range. In other words, a notch filter can be tuned (e.g., based on configuration, layout, and component values) to allow (i.e., "pass through") most frequencies without attenuation, but can be configured to reduce or block frequencies between a first and second rejected frequency.

In some embodiments, signal processor 212 can include multiple types or quantities of analog filters, which may be combined in various configurations to filter out particular frequencies or frequency ranges. For example, signal processor 212 may include multiple low-pass and high-pass filters, each with unique cutoff frequencies, that can be combined to function as a variable band-pass filter. In some embodiments, signal processor 212 includes adjustable filters. In other words, signal processor 212 may selectively include components or may adjust the value of certain components to adjust the response to each filter. For example, signal processor 212 may dynamically adjust a cutoff frequency of a high-pass filter by selectively adding or removing components. As another example, a resistive element in a filter may be adjustable (e.g., a potentiometer) such that signal processor 212 may dynamically adjust the resistive element's value.

In some embodiments, signal processor 212 includes one or more digital filters in place of, or in addition to, the analog filters described above. In some such embodiments, signal processor 212 includes at least one of a digital low-pass filter, a digital high-pass filter, a digital band-pass filter, or a digital notch filter. Digital filters themselves generally do not use specific analog components to filter audio signals; rather, digital filters may be implemented by first converting an analog audio signal into a digital signal and then performing one or more mathematical functions on the digital signal. Accordingly, while shown as a separate component in audio device 200, the functionality of signal processor 212 may be implemented as software in some embodiments (e.g., when using digital filters). In such embodiments, signal processor 212 may be a component of memory 206 or at least a portion of the functionality of signal processor 212 described herein may be implemented by executing computer code or other instructions stored on memory 206.

In some embodiments, signal processor 212 also includes an analog-to-digital converter (ADC) configured to convert analog audio signals into digital signals, which may be necessary for digital filtering as described above. Specifically, an ADC may convert the continuous-time and continuous-amplitude analog signal into a discrete-time and discrete-amplitude digital signal, such as by sampling the analog audio signal at a predetermined sampling rate. Thus, after conversion, the digital signal may be filtered using any of the digital filters described above. In some embodiments, signal processor 212 includes a combination of analog and digital filters. In some embodiments, signal processor 212 includes a digital-to-analog converter (DAC) for converting the filtered digital signal back into an analog signal.

As shown, audio device 200 can also include a speaker 214 configured to produce sound. In particular, speaker 214 may receive a filtered digital or analog audio signal from signal processor 212, which can then be reproduced as sound. Speaker 214 may be configured to project this sound towards a user's ear or into the user's ear canal. Thus, the user may hear only filtered audio based on ambient noise, rather than unfiltered ambient noise which may include unpleasant or damaging frequencies. At a concert, for example, extended exposure to high frequencies may cause hearing damage and discomfort, which may be mitigated by filtering the sound through audio device 200. As another example, the sirens of emergency vehicles, which typically emit around 1800 Hz, may be damaging and/or distracting to emergency workers (e.g., emergency medical technicians (EMTs), police, firefighters, etc.). However, audio device 200 could be configured to attenuate 1800 Hz to increase the emergency worker's comfort and awareness.

In some embodiments, audio device 200 includes a battery 216 for powering one or more of the components described herein. Specifically, battery 216 may be sized (e.g., by capacity) to power the various components of audio device 200 for a predetermine period of time (e.g., one day, one week, etc.). In some embodiments, battery 216 is rechargeable via a charging cable or wirelessly (e.g., Qi charging). For example, battery 216 may be lithium-ion (Li-ion), nickel-metal hydride (NiMH), or any other suitable type of rechargeable battery. In some embodiments, battery 216 is replaceable. For example, battery 216 may be a zinc-air button disposable battery, or the like.

Audio device 200 is also shown to include a communications interface 218. Communications interface 218 may facilitate communications between audio device 200 and any external components or devices, such as user device 250. For example, communications interface 218 can provide means for communicating with (i.e., transmitting data to or receiving data from) user device 250. Accordingly, communications interface 218 can be or can include a wired or wireless communications interface (e.g., jacks, antennas, transmitters, receivers, transceivers, wire terminals, etc.) for conducting data communications. In various embodiments, communications via communications interface 218 may be direct (e.g., local wired or wireless communications) or via a network (e.g., a WAN, the Internet, a cellular network, etc.). In some embodiments, communications interface 218 includes a low-power or short-range wireless transceiver (e.g., Bluetooth®). As another example, communications interface 218 may include cellular or mobile phone communications transceivers. In yet another example, communications interface 218 can include a WiFi transceiver for communicating via a wireless communications network.

In some embodiments, audio device 200 is communicably coupled to user device 250 via communications interface 218 (e.g., via a wireless network). For example, audio device 200 and user device 250 may communicate wirelessly through a short-range wireless connection, such as Bluetooth®. Accordingly, user device 250 can also include a communications interface 266 that is functionally similar to, or the same as, communications interface 218. In other words, communications interface 266 can include any suitable wired or wireless communications interface(s) for communicating with audio device 200. In some embodiments, user device 250 can include multiple types of interfaces for different types of communication. For example, user device 250 may include a short-range transceiver for communicating with audio device 200 and a cellular network transceiver for wireless communications with a cellular network.

Still referring to FIG. 2, user device 250 is shown to include an audio sensor 260 and a signal processor 262, which may be functionally equivalent to audio sensor 210 and signal processor 212, respectively, as described above. Specifically, audio sensor 260 may be a microphone or other type of transducer capable of capturing sound from a space occupied by a user. For example, audio sensor 260 may be the microphone of a smartphone carried by the user (e.g., in hand or in a pocket). Accordingly, audio sensor 260 may continuously detect and/or record audio from the user's environment. Likewise, signal processor 262 can include any quantity and combination of analog and/or digital audio filters, an ADC, a DAC, and any other suitable components for filtering the recorded ambient noise.

In some embodiments, user device 250, rather than audio device 200, is configured to record and filter ambient noise, as described above. For example, it may be advantageous to configure audio device 200 without one or both of audio sensor 210 and signal processor 212 to save space, reduce energy consumption, and/or to reduce computational resource requirements for audio device 200. In such embodiments, audio sensor 260 and/or signal processor 262 may perform the functions described herein; however, it will be appreciated that audio device 200 and user device 250 may be implemented with any configuration of audio sensors and/or signal processors. For example, audio sensor 210 may be configured to record ambient noise, which is then transferred to user device 250 (e.g., specifically, signal processor 262) for filtering, before the filtered audio signal is transmitted back to audio device 200 to be reproduced by speaker 214. In another example, audio sensor 260 may record ambient noise, which is filtered by signal processor 262 before being transmitted to audio device 200. Accordingly, any such division of functionality between audio device 200 and user device 250 is contemplated herein.

As shown, user device 250 may also include a user interface 264 for displaying information and/or receiving user inputs. Specifically, user interface 264 can include a screen for displaying graphics and other information, as described in greater detail below with respect to FIGS. 4A and 4B. Additionally, user interface 264 can include a user input device such as a keypad, a keyboard, a mouse, a stylus, etc. In some embodiments, user interface 264 includes a touchscreen display (e.g., a liquid crystal (LCD) or LED screen) that can both display information in the form of text and/or graphics, and that can receive user inputs.

In some embodiments, although not shown in FIG. 2, audio device 200 may also include a user interface that is functional similar to user interface 264, or that provides limited functionality for making user selections. For example, audio device 200 may include a touch sensitive surface that can detect user inputs but, in some cases, may not include a display. In some embodiments, audio device 200 may include various light emitting diodes (LEDs) or the like for displaying limited information to a user. Alternatively, or additionally, audio device 200 may play sounds through speaker 214 responsive to user inputs or to convey other information. In some embodiments, audio device 200 also includes a haptic motor or other vibrating device for providing alters or notifications to the user. For example, audio device 200 can vibrate (e.g., by actuating the haptic motor) responsive to receiving an indication of a text message or other alert from user device 250.

Selective Frequency Attenuation

Figure 3:
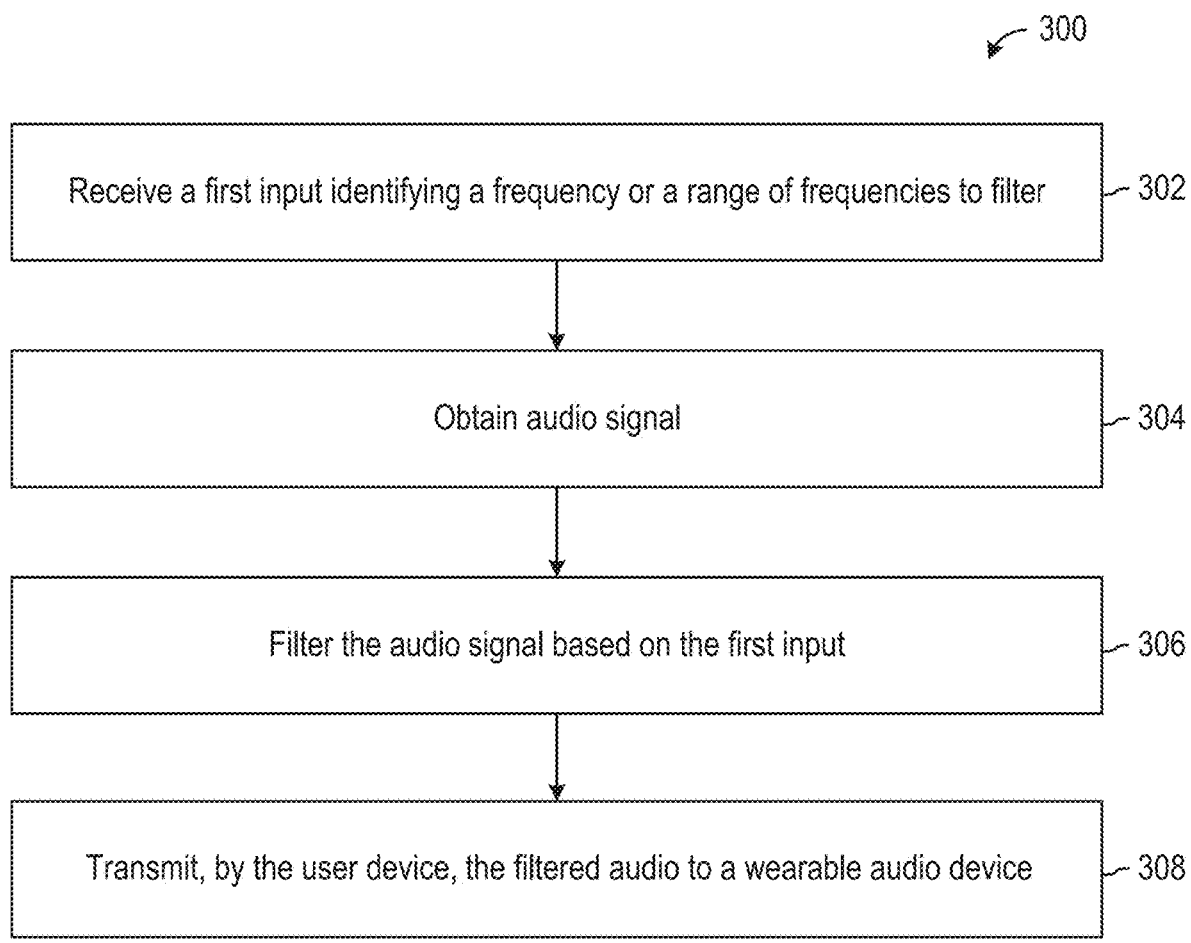
FIG. 3 is a process for selectively filtering an audio signal to attenuate selected frequencies, according to some embodiments.

Referring now to FIG. 3, a process 300 for selectively filtering an audio signal to attenuate selected frequencies is shown, according to some embodiments. Unlike many other methods and systems that do not attenuate ambient sound or that attenuate all frequencies, including desirable frequencies, in ambient sound, process 300 advantageously allows for selective frequency attenuation and provides users with control over the specific frequency or frequency range that is attenuated. In some embodiments, process 300 is implemented by one or both of audio device 200 and user device 250. In some such embodiments, audio device 200 and user device 250 may implement certain steps of process 300 independently or cooperatively. It will be appreciated that certain steps of process 300 may be optional and, in some embodiments, process 300 may be implemented using less than all of the steps shown.

At step 302, a first input that identifies a frequency or range of frequencies to block (i.e., filter) is received. In some embodiments, the first input is a user input to a user interface, such as user interface 264 of user device 250. For example, the user may select a frequency or range of frequencies via a software application running on the user's portable electronic device (e.g., smartphone). In some such embodiments, the first user input may be stored locally in a memory of the user device. In other embodiments, the first user input is transmitted to a wearable audio device. For example, the wearable audio device may be a pair of electronic headphones that are wirelessly coupled (e.g., via a short-range wireless connection) to the user's device. Additional features and description of a user interface for receiving user inputs are described in greater detail below with respect to FIGS. 4A and 4B.

At step 304, an audio signal is obtained. In some embodiments, the audio signal is obtained by recording ambient noise in an environment or space occupied by the user. In some such embodiments, ambient noise is recorded over a period of time or is continuously recorded. For example, ambient noise may be recorded and stored in a local memory of audio device 200 or user device 250. Alternatively, in some embodiments, an audio signal is generated in real-time by continuously converting detected ambient noise into an analog signal. In some embodiments, a digital audio signal is obtained by sampling recorded noise at a regular interval.

In some embodiments, ambient noise is detected and/or recorded by an audio sensor positioned on the wearable audio device associated with the user (e.g., a pair of wireless headphones or ear buds). Specifically, the audio sensor, which may be a microphone, piezoelectric transducer, or the like, may be positioned to detect noise proximal to the user. For example, in a pair of ear buds similar to those shown in FIG. 1A, the audio sensor may be positioned on an outer housing and facing outwards from the user to detect ambient noise. In some embodiments, ambient noise is detected and/or recorded by an audio sensor positioned on the user's device. For example, a microphone in the user's smartphone may continuously detect ambient noise and convert said ambient noise into an audio signal.

At step 306, the audio signal is filtered to attenuate the identified frequencies. In some embodiments, filtering the audio signal includes first converting the audio signal, which is typically an analog signal, into a digital signal. Accordingly, in such embodiments, the analog audio signal may first be passed through an ADC to covert the analog signal to a digital signal. Subsequently, the now-digital signal may be filtered to attenuate one or more specified frequencies (e.g., based on the first input) using one or more digital filters. As described above, digital filters may be one or more software components that perform mathematical operations on the digital signal to remove or attenuate specific frequency components. In some embodiments, the filtered digital signal may be converted by to an analog signal using a DAC.

In other embodiments, conversion to a digital signal is not necessary. Rather, the analog audio signal may be pass through one or more analog filters, including but not limited to one or more low-pass, high-pass, band-pass, or notch filters. As described above, any of these filters may be selectively tuned based on the first user input received at step 302. If a user has selected to attenuate any frequencies above 18 kHz, for example, a low-pass filter may be automatically tuned (e.g., by adding/removing components from a circuit, by adjusting a value of one or more components, etc.) to a cutoff frequency of 18 kHz. In some embodiments, multiple filters may be combined (i.e., the signal may pass through multiple filters) to achieve a desired attenuation. For example, the signal may be pass through both a low-pass and high-pass filter to attenuate frequencies above and below representative cutoff frequencies. Additionally, it will be appreciated that, in some embodiments, a combination of digital and analog filters may be used.

At step 308, the filtered audio signal is transmitted to a wearable audio device. As mentioned above, the wearable audio device (e.g., headphones, ear buds, hearing aids, etc.) may be wireless coupled to a user's personal device (e.g., smartphone) via a short-range wireless connection or other wireless network. Accordingly, in certain embodiments where steps 302-306 are implemented by the user's device (e.g., user device 250), the filtered audio may be wireless transmitted to the wearable audio device such that the wearable audio device can reproduce the filtered audio as sound. However, it will be appreciated that step 308 of process 300 may be optional. In other embodiments, the wearable audio device may implement one or more steps of process 300, including filtering the original audio signal; thus, transmission of the filtered audio to the wearable audio device is not needed.

In any case, the wearable audio device may be configured to produce sound (e.g., via a speaker) based on the filtered audio. In this manner, the user may hear a filtered "version" of the original ambient noise that removes one or more selected frequency components. For example, the user may filter out high frequencies to avoid hearing damage while maintaining low frequency sounds such as human voices, etc. Accordingly, process 300 may be implemented in real-time to provide a continuous feed of filtered ambient audio.

User Interfaces

Figure 4A:
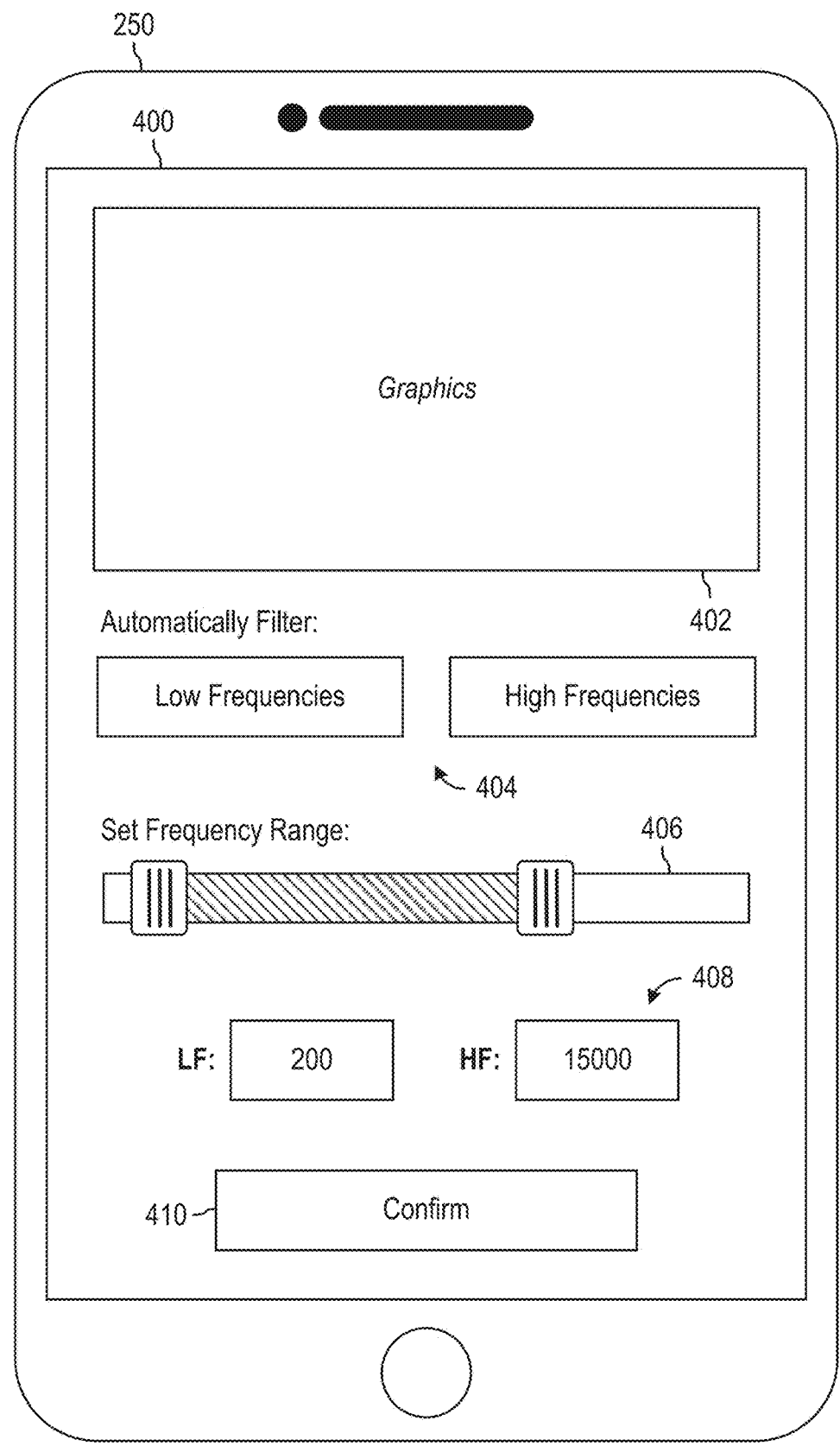
FIGS. 4A and 4B are example user interfaces for selective frequency attenuation, according to some embodiments.
Figure 4B:
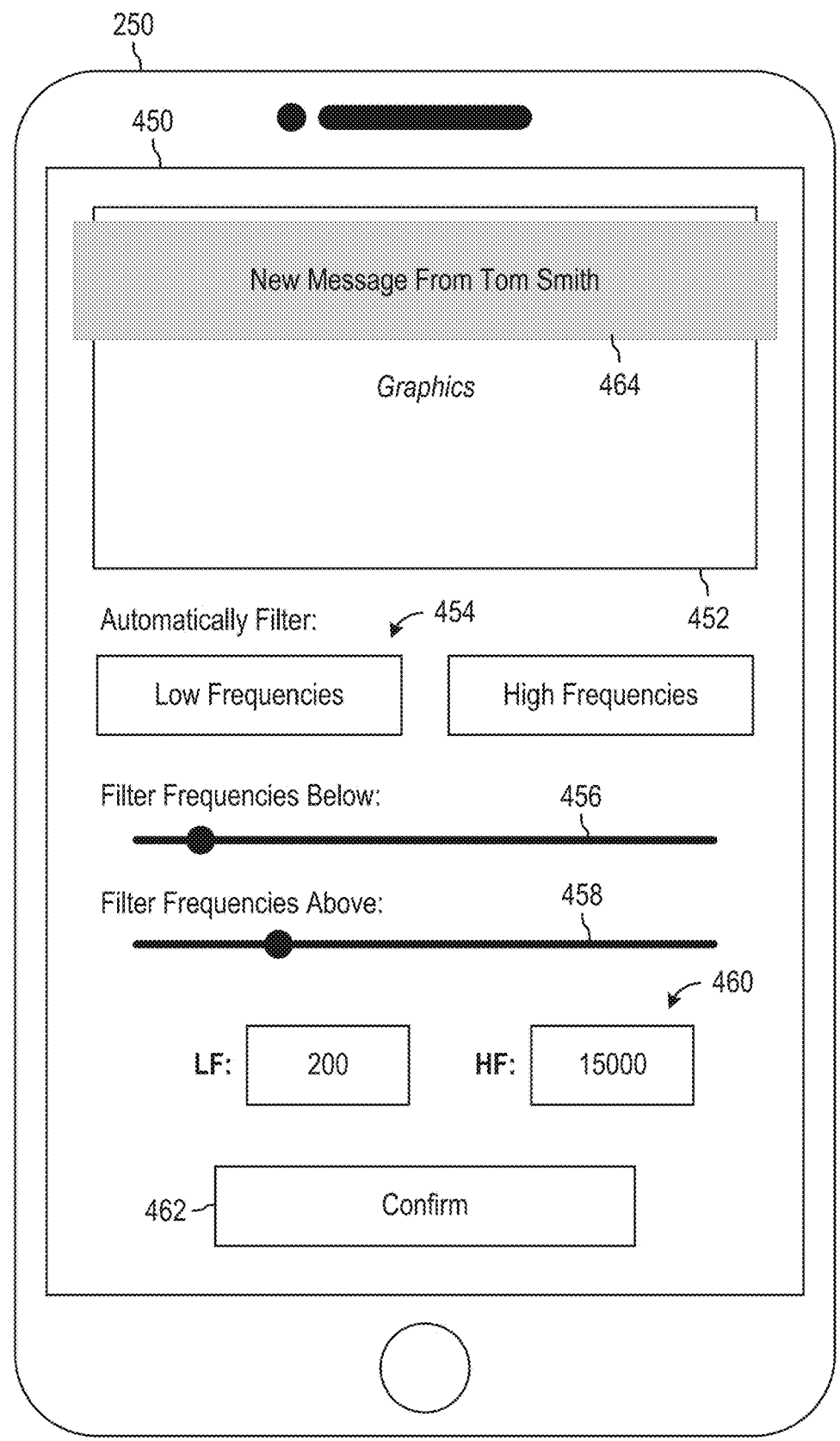

Referring now to FIGS. 4A and 4B, example user interfaces for selective frequency attenuation are shown, according to some embodiments. The user interfaces shown may be generated and/or presented by user device 250, for example, or by any other type of display. In one example, these user interfaces may be included in a software application (i.e., an "app") executed by the user's smartphone or other personal electronic device. Specifically, the user may open (i.e., run) the application in order to select one or more frequencies for attenuation, which in turn may activate a corresponding wearable audio device. However, it will be appreciated that the user interfaces shown in FIGS. 4A and 4B are merely examples that are not intended to be limiting. Accordingly, the specific layout, design, and functionality of these interfaces may be modified for various different implementations.

Turning first to FIG. 4A, a first example interface 400 is shown displayed on user device 250. Interface 400 is shown to include a first graphical element 402, which may be configured to display text, graphics, or any other information based on various different implementations. For example, element 402 may be configured to display information relating to the wearable audio device, such as a battery level of the device, a connection quality, a current mode, etc. In some embodiments, element 402 is configured to display information relating to detect ambient noise, such as a noise level (e.g., in dB), detected frequencies, etc. In some such embodiments, element 402 may be configured to display graphics such as charts, graphs, etc., to display said information.

Interface 400 also includes predefined filter buttons 404, which may provide a convenient way for the user to select predefined frequency ranges for filtering. As shown, for example, buttons 404 may include a "Low Frequencies" button and a "High Frequencies" button for automatically selecting a predefined low or high-frequency range. For example, the user may select the "Low Frequencies" button to filter out frequencies below a predefined cutoff frequency. In some embodiments, buttons 404 are customizable by the user. In other words, the user may modify the frequency ranges associated with each of buttons 404.

Also shown in a frequency range slider 406, which is a graphical element with one or more points that may be manipulated (i.e., moved) to adjust the range of allowed (i.e., non-attenuated) frequencies. In this example, slider 406 includes two elements corresponding to a lower cutoff frequency and an upper cutoff frequency, which can by manually adjusted (e.g., by tapping and sliding) to adjust the frequency range. In some embodiments, the area between the lower and upper cutoff frequencies may be visually differentiated from the attenuated frequencies. In this case, the range of allowed frequencies may be indicated by shading. It will be appreciated, however, that other types of graphical elements may be substituted for slider 406.

In some embodiments, one or more text boxes 408 are automatically updated to reflect the lower and upper frequencies selected via slider 406. In this example, the user has selected (e.g., via slider 406) a lower cutoff frequency of 200 Hz and an upper cutoff frequency of 15 kHz. In some embodiments, text boxes 408 also accept user inputs, such that a user may type or otherwise indicate a specific frequency in one of text boxes 408 in order to update the lower or upper cutoff frequencies. In some such embodiments, slider 406 may be automatically updated to reflect the frequencies entered by the user in text boxes 408. For example, if the user enters a lower cutoff frequency of 0 Hz, slider 406 may update to move the leftmost element (e.g., corresponding to the lower cutoff frequency) to the leftmost portion of the range. After selecting one or more frequencies for attenuation, the user may select a "Confirm" button 410 to confirm their selection and/or to cause user device 250 to transmit the selected frequencies to the wearable audio device (e.g., audio device 200).

Turning now to FIG. 4B, an alternate configuration user interface 400 is shown as an example user interface 450. Interface 450 can include a first graphical element 452 and predefined filter buttons 454 similar to interface 400. However, unlike interface 400, interface 450 may include two separate sliders, or other types of graphical elements, for selecting frequencies for attenuation. Specifically, interface 450 is shown to include a low-pass slider 456 and a high-pass slider 458 for selecting lower and upper cutoff frequencies, respectively. In other words, a user may move the icon of low-pass slider 456 to select a lower cutoff frequency and may move the icon of high-pass slider 458 to select an upper cutoff frequency.

Like interface 400, interface 450 may also include text boxes 460 that are automatically updated to reflect the lower and upper frequencies selected via low-pass slider 456 and high-pass slider 458. In this example, the user has selected a lower cutoff frequency of 200 Hz and an upper cutoff frequency of 15 kHz. In some embodiments, text boxes 460 also accept user inputs and, accordingly, low-pass slider 456 and/or high-pass slider 458 may be automatically updated to reflect the frequencies entered by the user in text boxes 460. After selecting one or more frequencies for attenuation, the user may select a "Confirm" button 462 to confirm their selection and/or to cause user device 250 to transmit the selected frequencies to the wearable audio device (e.g., audio device 200).

In some embodiments, the user interfaces described herein are also configured to display alerts or notifications. As shown in interface 450, for example, a notification 464 is presented as a pop-up or overlay. In this example, notification 464 (e.g., a push notification) provides an indication that a text or email message was received from a contact associated with the user, although other notifications may relate to alerts (e.g., low battery, weather or traffic, security, etc.) or other types of notifications (e.g., battery level, received messages, calls, etc.). In some embodiments, alerts or notifications, such as notification 464, may be transmitted to the wearable audio device (e.g., audio device 200) and/or may cause the wearable audio device to provide an alert to the user. In some such embodiments, the wearable audio device may be configured to produce a sound (e.g., a chime, a beep, a voice memo, etc.) alerting the user to the received notification. In some embodiments, the wearable audio device includes a haptic device, such as a vibrating motor, that vibrates or actuates to alert the user.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A wearable audio device comprising:
   a speaker;
   a wireless communications interface;
   an audio sensor configured to capture ambient noise in an environment occupied by a user wearing the wearable audio device; and
   memory having instructions stored thereon that, when executed by one or more processors, cause the one or more processors to perform operations comprising:
      receiving, via the wireless communications interface, from a user device associated with the user, a first user input identifying a frequency range to be attenuated, wherein the user device is configured to present a graphical user interface (GUI) comprising at least one of a movable slider or a text entry field for entering, by the user, the first user input;
      generating an audio signal from the captured ambient noise;
      attenuating the audio signal to reduce an amplitude of one or more frequency components based on the frequency range; and
      causing the speaker to produce sound based on the attenuated audio signal.

2. The wearable audio device of claim 1, further comprising a haptic device configured to produce vibrations, the operations further comprising:
   receiving, via the wireless communications interface, a notification from a user device associated with the user; and
   causing the haptic device to produce vibrations responsive to the notification.

3. The wearable audio device of claim 1, wherein the audio sensor is a microphone or a piezoelectric transducer.

4. The wearable audio device of claim 1, wherein attenuating the audio signal comprises passing the audio signal through at least one of a low-pass filter, a high-pass filter, a band-pass filter, or a notch filter.

5. The wearable audio device of claim 1, further comprising an analog-to-digital converter (ADC), wherein generating the audio signal comprises passing the audio signal through the ADC to convert the audio signal into a digital signal.

6. The wearable audio device of claim 5, wherein the digital signal is attenuated using a digital notch filter.

7. The wearable audio device of claim 1, wherein the wearable audio device is configured as over-ear headphones, in-ear headphones, a behind-the-ear hearing aid, an in-the-ear hearing aid, a receiver-in-the-ear hearing aid, or an implantable hearing aid.

8. A method for selectively attenuating frequencies in an audio signal, the method comprising:

capturing, by an audio sensor in a wearable audio device, the audio signal;

receiving, from a user device associated with a user of the wearable audio device, an indication of a frequency range to be attenuated from the audio signal, wherein the user device is configured to present a graphical user interface (GUI) comprising at least one of a movable slider or a text entry field for entering, by the user, the indication of the frequency range;

generating an attenuated audio signal by removing or reducing one or more frequency components in the audio signal based on the frequency range; and producing, by a speaker of the wearable audio device, sound based on the attenuated audio signal.

9. The method of claim 8, further comprising:

receiving, from a remote computing device, a notification; and causing a haptic device of the wearable audio device to produce vibrations responsive to the notification.

10. The method of claim 8, wherein the audio sensor is a microphone or a piezoelectric transducer.

11. The method of claim 8, wherein generating the attenuated audio signal comprises filtering the audio signal through at least one of a low-pass filter, a high-pass filter, a band-pass filter, or a notch filter.

12. The method of claim 8, wherein the audio signal is an analog signal, the method further comprising converting the audio signal into a digital signal prior to generating the attenuated audio signal.

13. The method of claim 12, wherein the digital signal is attenuated using a digital notch filter.

14. The method of claim 8, wherein the wearable audio device is one of over-ear headphones, in-ear headphones, a behind-the-ear hearing aid, an in-the-ear hearing aid, a receiver-in-the-ear hearing aid, or an implantable hearing aid.

15. In-ear headphones comprising:

a wireless communications interface for receiving data from a remote computing device;

a microphone configured to capture ambient noise; and memory having instructions stored thereon that, when executed by one or more processors, cause the one or more processors to perform operations comprising:

converting the captured ambient noise into a first digital signal;

receiving, from the remote computing device, an indication of one or more frequency components to remove from the first digital signal, wherein the remote computing device is configured to present a graphical user interface (GUI) comprising at least one of a movable slider or a text entry field for entering, by a user, the indication of the one or more frequency components;

generating a second digital signal by filtering the first digital signal to remove the one or more frequency components;

converting the second digital signal into a first analog signal; and producing sound based on the first analog signal.

16. The in-ear headphones of claim 15, further comprising a haptic device configured to produce vibrations, the operations further comprising:

receiving, via the wireless communications interface, a notification from the remote computing device; and causing the haptic device to produce vibrations responsive to the notification.

* * * * *